(12) United States Patent
Huber et al.

(10) Patent No.: US 8,925,860 B2
(45) Date of Patent: Jan. 6, 2015

(54) CARGO HOLD FLOOR AND AIRCRAFT HAVING A CARGO HOLD FLOOR

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 560 days.

(21) Appl. No.: 13/208,116

(22) Filed: Aug. 11, 2011

(65) Prior Publication Data

US 2012/0061511 A1 Mar. 15, 2012

(30) Foreign Application Priority Data

Aug. 13, 2010 (DE) .......................... 10 2010 036 982

(51) Int. Cl.
*B64C 1/20* (2006.01)
*B64C 1/22* (2006.01)
*B64D 47/00* (2006.01)
*B64D 9/00* (2006.01)

(52) U.S. Cl.
CPC ... *B64C 1/20* (2013.01); *B64D 9/00* (2013.01); *B64C 1/22* (2013.01); *B64D 9/003* (2013.01)
USPC ...................................................... 244/118.1

(58) Field of Classification Search
USPC ................................ 244/118.1, 118.2, 137.1
See application file for complete search history.

(56) References Cited

U.S. PATENT DOCUMENTS

| | | | |
|---|---|---|---|
| 4,372,715 A * | 2/1983 | Naffa | 410/79 |
| 4,461,437 A * | 7/1984 | Ashley et al. | 244/137.3 |
| 5,090,639 A | 2/1992 | Miller et al. | |
| 2003/0057326 A1 | 3/2003 | Medina et al. | |
| 2013/0145593 A1* | 6/2013 | Holzner et al. | 29/401.1 |

FOREIGN PATENT DOCUMENTS

| | | |
|---|---|---|
| DE | 10043180 A1 | 4/2002 |
| DE | 102004016219 B3 | 6/2005 |
| WO | 2005012085 A1 | 2/2005 |
| WO | 2010149179 | 12/2010 |

* cited by examiner

*Primary Examiner* — Valentina Xavier
(74) *Attorney, Agent, or Firm* — Barnes & Thornburg LLP

(57) ABSTRACT

A cargo hold floor of an upper and/or a lower deck of an aircraft having a plane of symmetry which divides the cargo hold floor into a first half and a second half is disclosed, said cargo hold floor comprising locking gaps which each encompass all the locking elements located substantially on one level in the longitudinal direction (x direction) of the aircraft, in particular longitudinal locking elements for securing standardized cargo containers, in particular pallets and/or containers, in the longitudinal direction (x direction) of the aircraft whereby all the longitudinal locking elements of at least one locking gap are arranged in only one of the halves.

16 Claims, 6 Drawing Sheets

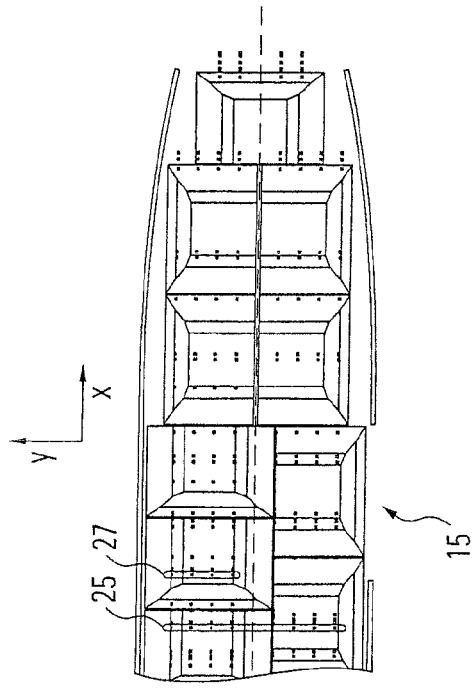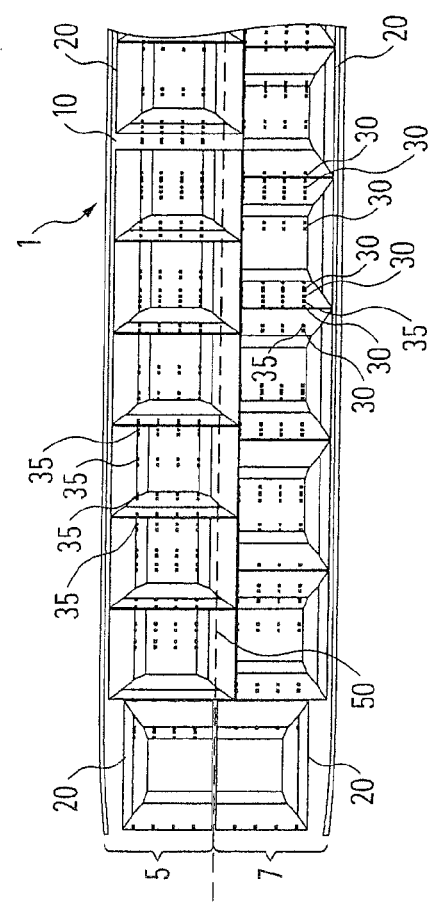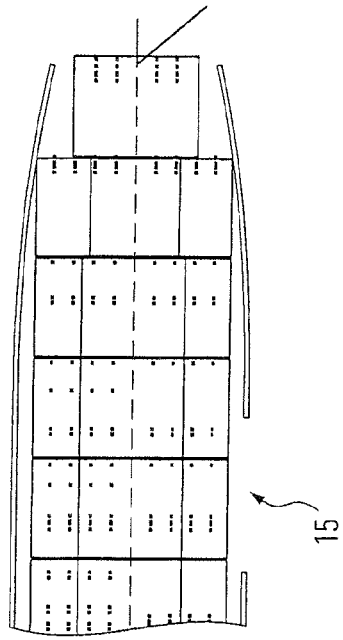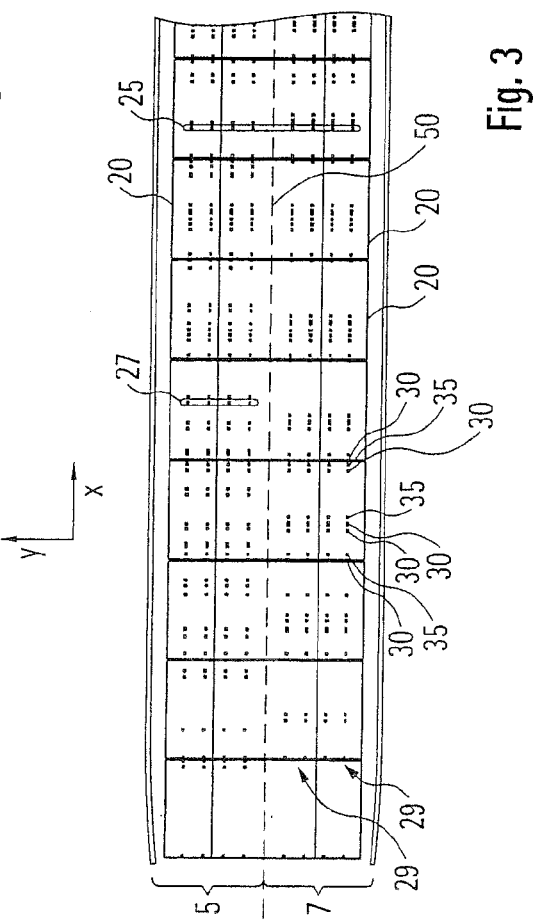
Fig. 2
Fig. 3

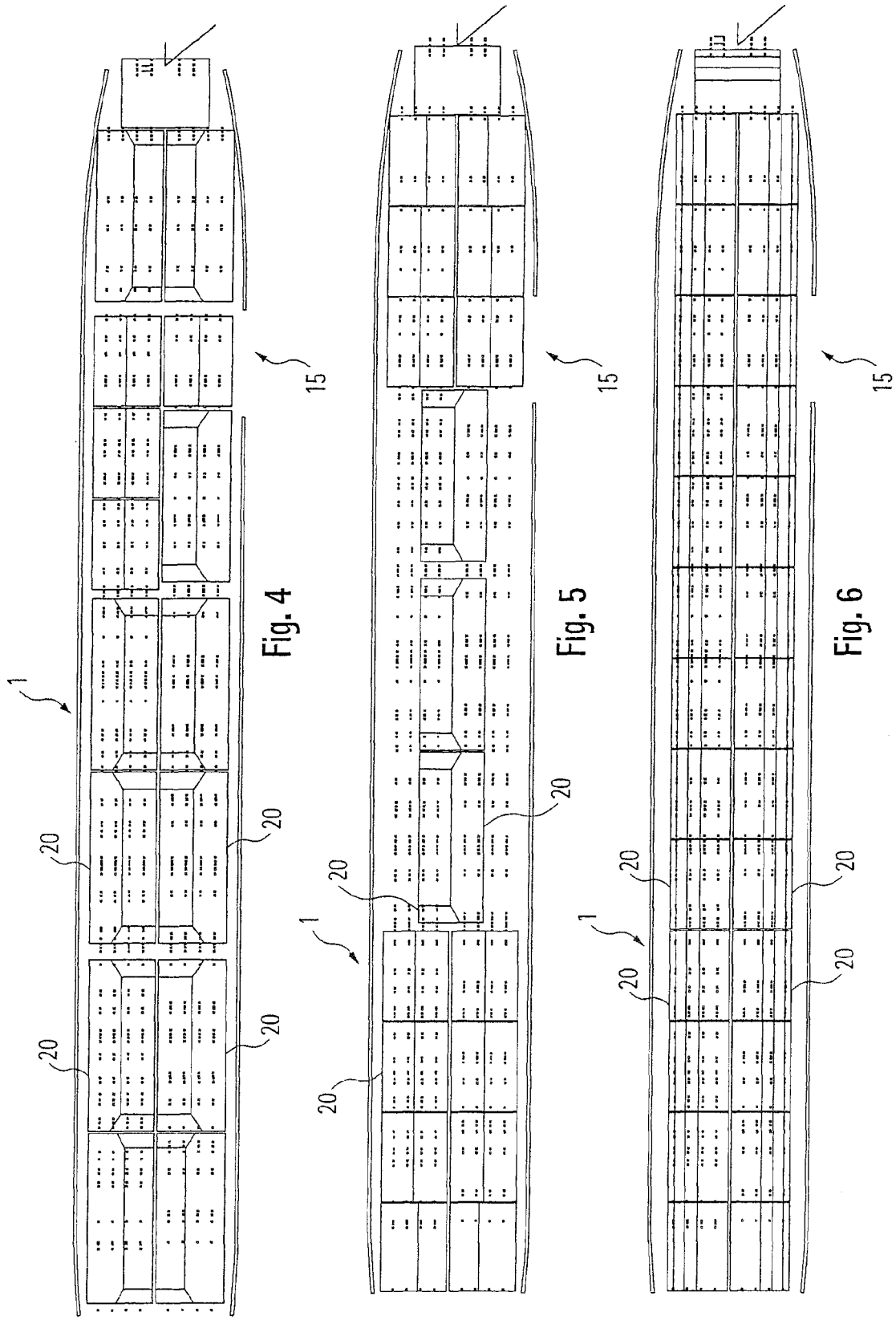

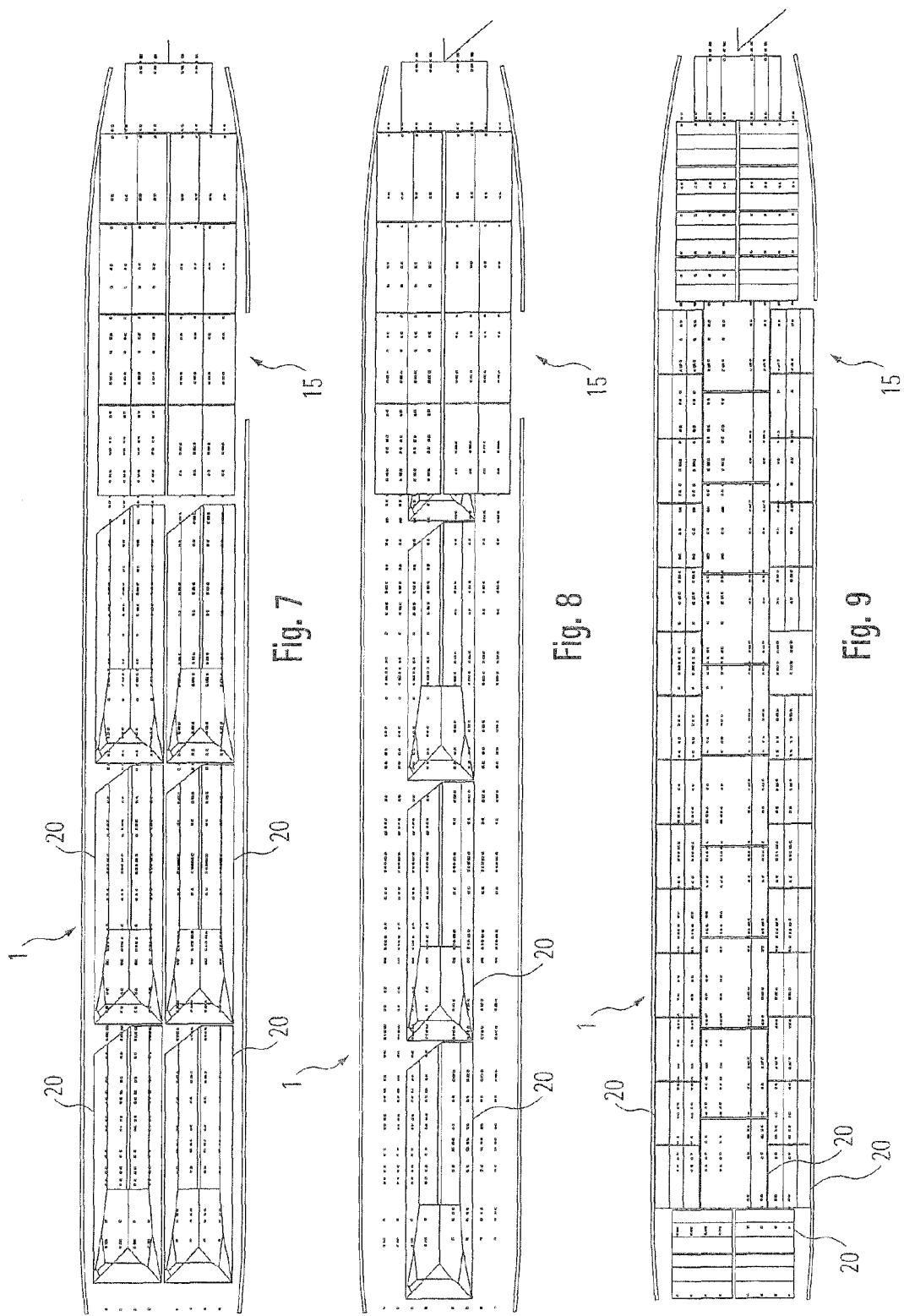

CARGO HOLD FLOOR AND AIRCRAFT HAVING A CARGO HOLD FLOOR

CROSS-REFERENCE TO RELATED APPLICATIONS

This application claims priority of German patent application no. 10 2010 036 982.9, filed Aug. 13, 2010, the disclosure of which is incorporated herein by reference in its entirety.

FIELD OF THE INVENTION

The invention relates to a cargo hold floor according to claim 1 and an aircraft having a cargo hold floor according to claim 16.

BACKGROUND OF THE INVENTION

Nowadays a largo proportion of cargo is no longer transported by ship but by aircraft. The cargo is transported in cargo units, e.g. containers, to speed up loading and unloading. Daring the flight they must be braced so that they do not move during accelerations and so that the contents of the cargo containers and/or the aircraft are not potentially damaged as a result.

Usually, the cargo hold floor comprises a plurality of locking elements for fixing and guiding the cargo in the cargo hold. Longitudinal locking elements, for example, are used to fix the containers in the aircraft's longitudinal direction (x-direction). The known cargo hold floors and the arrangement of the locking elements attached thereto are mirror-symmetrical with regard to a plane of symmetry which encompasses the aircraft's longitudinal axis and is perpendicular to the cargo hold floor. The plane of symmetry divides the cargo hold into two essentially symmetrical halves in respect of its geometric extension. It is generally accepted that with an increasing number of transportable cargo containers and possible loading configurations, the number of locking elements required rises dramatically. A loading configuration may be defined as a specific arrangement of the cargo containers on the cargo hold floor.

The large number of possible loading configurations, particularly with containers of different sizes, leads to a large number of locking elements being required. The cargo hold floor becomes very heavy due to the large number of locking elements which has an adverse effect on the kerosene consumption and consequently on the operating costs. The disadvantage of cargo hold floors known to date is that they cannot be reconfigured quickly. Since the dimensions of the cargo hold floors in the aircraft are limited, the number of locking elements that can be fastened to the cargo hold floor and consequently the number of potential loading configurations is limited. By reducing the size of the locking elements, it is possible to increase the potential number of locking elements in a cargo hold floor which, however, has a very adverse effect on the ruggedness and load-carrying capacity of the locking elements.

SUMMARY OF THE INVENTION

Some embodiments of the invention demonstrate a cargo hold floor better suited to the transport of cargo containers.

In particular, some embodiments may demonstrate a cargo hold floor that offers a plurality of potential loading configurations.

This may be achieved by a cargo hold floor according to claim 1 and an aircraft having a cargo hold floor according to claim 16.

In particular, this may be achieved by a cargo hold floor of an upper and/or a lower deck of an aircraft having a plane of symmetry which divides the cargo hold floor into a first half and a second half, said cargo hold floor comprising locking gaps which each encompass all the locking elements located substantially on one level in the longitudinal direction (x direction) of the aircraft, in particular longitudinal locking elements for securing standardised cargo containers, in particular pallets and/or containers, in the longitudinal direction (x direction) whereby all the longitudinal locking elements of at least one locking gap are arranged in only one of the halves.

In some embodiments at least one locking gap only has longitudinal locking elements in one half of the cargo hold floor. As a result of this, the arrangement of the locking elements in the cargo hold floor is not symmetrical or asymmetrical relative to a plane of symmetry which encompasses the aircraft's longitudinal axis and is perpendicular to the cargo hold floor. The locking elements for securing the cargo containers are arranged at least partially asymmetrically relative to the plane of symmetry. As a result, a lower number of locking elements is required compared to conventional cargo hold floors with a high number of potential loading configurations for the cargo containers. Consequently, the weight of the cargo hold floor decreases. Furthermore, the maintenance cost and the probability of failure also decrease as a result. Mounting of the locking elements on/in the cargo hold floor is made considerably easier due to the asymmetry of the arrangement of locking elements since there is more space for this compared to a symmetrical arrangement of the locking elements. As a result, the cargo hold floor with the locking elements can be installed in or removed from the aircraft much faster.

A loading configuration may be defined as an arrangement of the cargo containers on the cargo hold floor. With a symmetrical loading configuration, the cargo containers are arranged symmetrically in relation to the plane of symmetry. With an asymmetrical loading configuration, the cargo containers are arranged asymmetrically in relation to the plane of symmetry. With an asymmetrical loading configuration, there are two potentially different loading configurations which merge at the plane of symmetry as a result of mirroring. One of the two potential arrangements of the locking gaps for these asymmetrical loading configurations was selected according to the invention in order to optimise the required number of locking elements.

A locking gap may defined such that a locking gap includes all the longitudinal locking elements that are located on one level in the aircraft's longitudinal direction (x direction).

The plane of symmetry may be defined as the plane which divides the relevant deck of the aircraft into two halves relative to its geometric extension. The plane of symmetry encompasses the aircraft's longitudinal axis and is perpendicular to the cargo hold floor.

In one embodiment, locking claws of the longitudinal locking elements of a locking gap are arranged in such a way that the locking claws form a limit stop line for one side of a cargo container. As a result, the forces arising during an acceleration of a cargo container are distributed over a plurality of locking claws. Consequently, the individual locking claws have to withstand forces that are not as high.

A stop line may be defined such that a stop line comprises the stop surfaces of locking claws which secure a cargo container on one side of said cargo container on the same level in the aircraft's longitudinal direction (x direction) (e.g. the stop surfaces lie in one plane).

A locking gap can be defined more accurately such that the locking gap comprises all the longitudinal locking elements that are located on one level in the aircraft's longitudinal direction (x direction) whereby at least one stop surface of each longitudinal locking from the locking gap lies in a stop plane associated with the locking gap.

At least one locking gap may comprise at least two, in particular at least four, longitudinal locking elements in one half. This ensures that the cargo container is secured on one side by at least two or at least four longitudinal locking elements as a result of which the individual longitudinal locking elements have to withstand lower forces.

In a further embodiment, the cargo hold floor comprises both symmetrical locking gaps which have longitudinal locking elements in both halves and also asymmetrical locking gaps which have longitudinal locking elements in only one half. This ensures that symmetrical loading configurations of the cargo hold are also possible. The cargo hold floor according to the invention comprises asymmetrical locking gaps in order to minimise the number of longitudinal locking elements required.

The distances between at least one locking gap and its two immediately adjacent locking gaps may differ in size. This further increases the number of potential loading configurations for the cargo containers. Two immediately adjacent locking gaps may be defined as two locking gaps between which no further locking gaps are arranged.

In a further embodiment, the locking gaps are arranged in such positions in the aircraft's longitudinal direction (x direction) in which no corresponding transverse locking elements for securing the cargo containers in the aircraft's transverse direction (y direction) are arranged on the same level in the aircraft's longitudinal direction (x direction). In this way, attachment or removal of the locking gaps or longitudinal locking elements and the transverse locking elements is further facilitated since the longitudinal locking elements and the transverse locking elements obstruct each other less severely.

In a further embodiment, the locking gaps are arranged for receiving standardised cargo containers which in particular have standard lengths and/or standard widths of approx. 62 inch (157.48 cm), approx. 88 inch (223.52 cm), approx. 96 inch (243.84 cm), approx. 125 inch (317.50 cm), approx. 238.5 inch (605.79 cm) and/or approx. 319 inch (810.26 cm). The advantage of this is that a large number of different, standardised cargo containers can be fastened to the cargo hold floor. This enables a plurality of potential loading configurations for cargo containers with standard dimensions in order to make the most efficient use of the cargo hold. In addition, cargo containers with standard dimensions can be fastened to the cargo hold floor both lengthways and also crossways by means of the locking gaps.

The distance between at least one pair of asymmetrical locking gaps may correspond to a standard length and/or standard width of cargo containers in the aircraft's longitudinal (x-direction). This ensures that an asymmetrical loading configuration with cargo containers that have a standard length and/or standard width is possible. With an asymmetrical loading configuration, the cargo containers are arranged asymmetrically in relation to the plane of symmetry.

The cargo hold floor may comprise anchor rails, in particular two per half, preferably four per half, in the aircraft's longitudinal direction (x direction) for receiving the longitudinal locking elements whereby the anchor rails are preferably part of roller conveyors. In this manner, the installation of the longitudinal locking elements is simplified considerably as they can be attached in existing anchor rails. Alignment of the locking gaps with each other is also simplified. Moreover, additional devices that are aligned without further interference in relation to the longitudinal locking elements can easily be arranged in the anchor rails. Another advantage of this is that the anchor rails provide a solid attachment for the longitudinal locking elements and good dissipation of the forces acting on the longitudinal locking elements.

According to the application, a locking gap may be defined such that a locking gap only comprises the longitudinal locking elements that are arranged on the same level in the anchor rails in the aircraft's longitudinal direction (x direction).

In sections at least, the distances of the anchor rails to each other may be the same size in each of the halves. The number of loading configurations that are possible is further increased due to the regular arrangement of the anchor rails in the two halves. Moreover, the forces arising within the halves is distributed evenly over the longitudinal locking elements. This also increases the safety of the cargo container's attachment.

In a further embodiment, at least one locking gap has locking elements with two locking claws essentially facing in opposing directions along the aircraft's longitudinal direction (x direction). In this way, the number of locking elements may be further reduced since every locking element with two locking claws can secure two different cargo containers.

In a further embodiment, transverse locking elements are arranged on the outer edge of the cargo hold floor as lateral guide elements which are fixable in various positions along the aircraft's transverse direction (y direction). This further increases the number of potential loading configurations for the cargo containers.

Corresponding lateral guide elements may be arrangeable in such a manner that the distance between the lateral guide elements is at least 5 m, in particular 5.4 m, or more. The advantage of this is that cargo containers with a very large extension in the aircraft's transverse direction (y direction) can also be guided and/or attached by the lateral guide elements.

The lateral guide elements comprise, for example, a mounting frame extending in the aircraft's transverse direction (y direction), at least one lateral guide device having a sliding carriage whereby the lateral guide device is movably supported in the mounting frame in the aircraft's transverse direction (y direction), the sliding carriage having at least one guide roller for supporting the cargo containers. The lateral guide device can preferably be moved with the help of a sliding carriage which is movably supported in the mounting frame. Fixing elements of the lateral guiding elements may, for example, comprise latch elements and mating latch elements at defined positions in the mounting frame and/or axle stubs which are movably supported preferably on or in the sliding carriage for releasing the fixing device, in particular counter to a spring force. The lateral guide device may include at least one locking claw for gripping the cargo containers at least in sections.

In a further embodiment, transverse locking elements, in particular having at least two locking claws, are arranged close to the plane of symmetry as central guide elements which are fixable in various positions along the aircraft's transverse axis (y direction). One advantage of this is that cargo containers that do not extend over the entire width of the deck can easily be fastened to the cargo hold floor. The cargo hold floor can also be adapted to cargo containers with different extensions in the aircraft's transverse direction (y direction). This increases the number of potential loading configurations.

In a further embodiment, locking claws of the transverse locking elements are at least partially movable independently of each other and/or foldable into a lowered position. The advantage of this is that the cargo hold floor can quickly and easily be adapted to cargo containers with different dimensions in the aircraft's transverse direction (y direction). Due to the foldability of the transverse locking elements into a lowered position in which the cargo containers can drive over them, it is not necessary to remove the transverse locking elements if they are not needed and they may remain in the cargo hold floor. Another advantage of this is that the number of potential symmetrical and asymmetrical loading configurations is further increased.

The object according to the invention is also achieved by means of an aircraft with said cargo hold floor.

BRIEF DESCRIPTION OF THE DRAWINGS

Preferred embodiments emerge from the subclaims. The invention will be described in greater detail in the following based on drawings of embodiments. The drawings show FIG. 1 a top view onto part of the cargo hold floor according to the invention;

FIG. 2 a top view onto a cargo hold floor with loaded cargo containers;

FIG. 3 a top view onto a cargo hold floor according to the invention with loaded cargo containers;

FIG. 4-10 in each case top views onto a cargo hold floor with different loading configurations of cargo containers.

DETAILED DESCRIPTION

Figure 1:
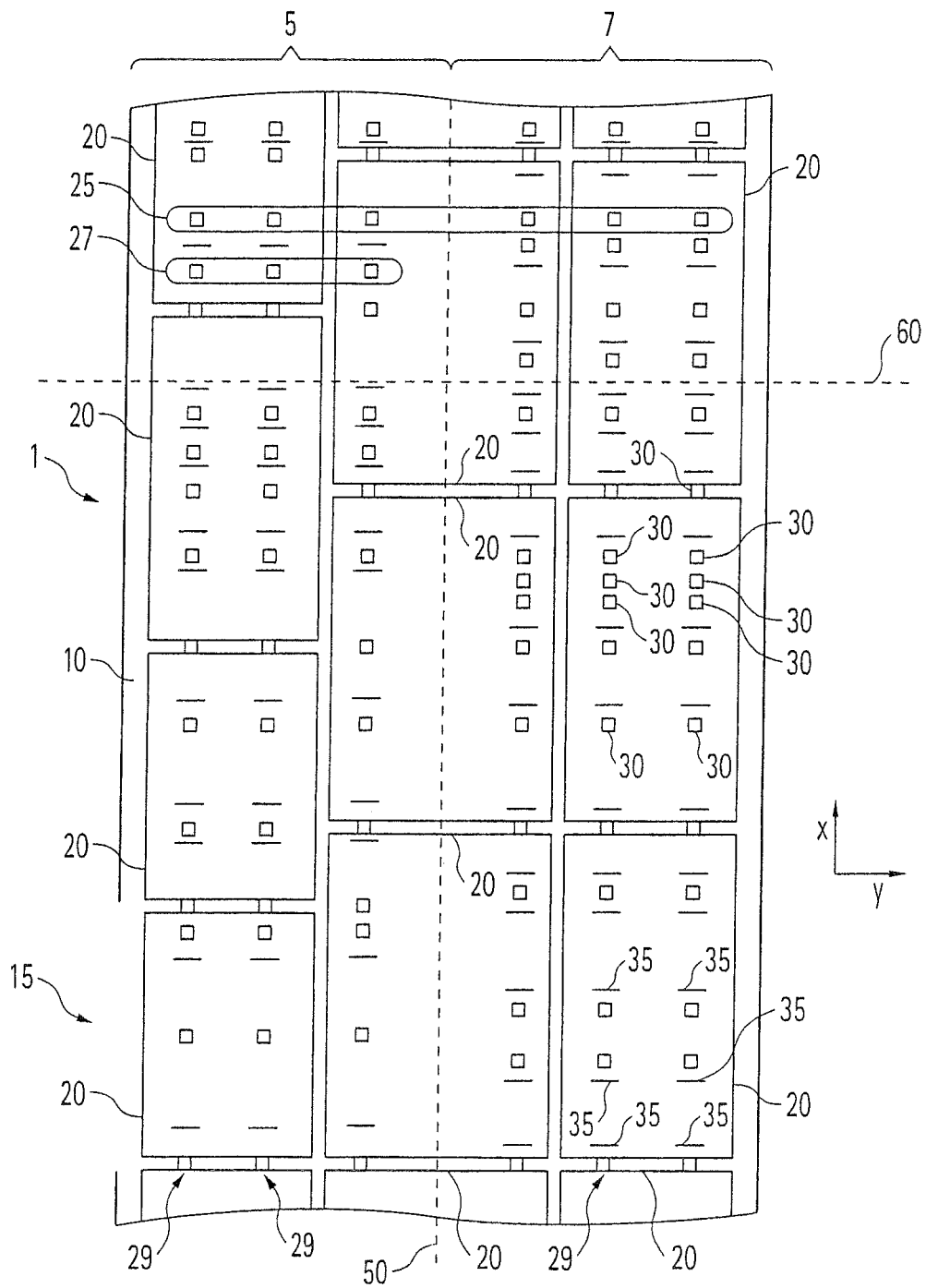

The same reference numerals are used in the following description for identical parts and parts acting in an identical manner.

FIG. 1 shows a top view onto part of a cargo hold floor 10 according to the invention of an aircraft 1. Plane of symmetry 50 runs through the centre of cargo hold floor 10. Plane of symmetry 50 divides the deck of aircraft 1 into a first half 5 and a second half 7. The deck may be the lower deck usually described as the cargo hold deck and/or the upper deck of aircraft 1 usually described as the passenger deck. Each deck of aircraft 1 is essentially symmetrical relative to plane of symmetry 50 in respect of its geometric extension. Plane of symmetry 50 encompasses the longitudinal axis of aircraft 1 and is perpendicular to cargo hold floor 10. Plane of symmetry 50 divides cargo hold floor 10 or the cargo hold into two substantially symmetrical halves 5, 7 in respect of its geometric extension. The longitudinal axis and longitudinal direction (x direction of aircraft 1 are substantially defined by the joining line between nose and tail of aircraft 1.

Cargo hold floor 10 comprises a plurality of locking gaps 25, 27 which each encompass all locking elements 30 located substantially on one level in the longitudinal direction (x direction) of aircraft 1, in particular longitudinal locking elements 30, for securing standardised cargo containers 20 in the longitudinal direction (x direction) of aircraft 1. Cargo containers 20 may in particular be pallets and/or containers or similar. Locking elements 30 shown in FIG. 1 are longitudinal locking elements which secure cargo containers 20 substantially in the longitudinal direction (x direction) of aircraft 1.

Cargo hold floor 10 further encompasses transverse locking elements (not shown in FIG. 1). Transverse locking elements 40, 45, 47 may be designed to guide cargo containers 20 in the longitudinal direction (x direction) of aircraft 1 and/or to secure cargo containers 20 substantially in the transverse direction (y direction) of aircraft 1. The transverse locking elements may, if they are designed for securing cargo containers 20, also secure cargo containers 20 in the longitudinal direction (x direction) of aircraft 1 to a limited extent. The same applies to longitudinal locking elements 30. However, the main securing function of longitudinal locking elements 30 is securing cargo containers 20 in the longitudinal direction (x direction) of aircraft 1. In the case of longitudinal locking elements 30, the relevant locking claw or relevant locking claws point in or in and counter to the longitudinal direction (x direction) of aircraft 1.

Locking gaps 25, 27 are symmetrical locking gaps 25, which encompass longitudinal locking elements 30 in both halves 5, 7, and also locking gaps 27, which only encompass longitudinal locking elements 30 in one half 5, 7.

The distances (y direction) between longitudinal locking elements 30 of a locking gap 25, 27 from each other are essentially the same size in each of the halves 5, 7. It is, however, conceivable that the distances are of different sizes. In FIG. 1, symmetrical and asymmetrical locking gaps 25, 27 encompass six and three longitudinal locking elements 30 respectively. A lower or higher number of longitudinal locking elements 30 per locking gap 25, 27 is conceivable.

The arrangement of longitudinal locking elements 30 in cargo hold floor 10 is asymmetrical relative to the deck's plane of symmetry 50. This means that a lower number of longitudinal locking elements 30 is needed than with a symmetrical arrangement of longitudinal locking elements 30. Due to the lower number of longitudinal locking elements 30 in an asymmetrical cargo hold floor 10, space is saved which makes the arrangement of longitudinal locking elements 30 for securing cargo containers 20 in the longitudinal direction (x direction) of aircraft 1 and also of transverse locking elements 40, 45, 47 considerably easier. The arrangement of other or further functional elements is also rendered easier as a result of this.

The arrangement of longitudinal locking elements 30 in FIG. 1 is not merely asymmetrical in respect of plane of symmetry 50 but is also asymmetrical relative to fuselage centre-line 60 which runs perpendicular to plane of symmetry 50 and parallel to cargo hold floor 10. The asymmetry relative to fuselage centre-line 60 is a potential embodiment. The asymmetry of the arrangement of longitudinal locking elements 30 relative to plane of symmetry 50 is present and essential for the invention at least in the main region of aircraft 1 where the fuselage is at its maximum width.

Due to the different distances between locking gaps 25, 27 in the longitudinal direction (x direction) of aircraft 1, it is achieved that a plurality of different cargo containers 20 with different extensions or standard lengths and/or standard widths can be fixed to cargo hold floor 10.

FIG. 1 shows containers 20 with varying measurements in a loading configuration. A loading configuration may be defined as an arrangement of cargo containers 20 on cargo hold floor 10. With a symmetrical loading configuration, cargo containers 20 are arranged symmetrically in relation to plane of symmetry 50 (e.g. FIG. 3). With an asymmetrical loading configuration, cargo containers 20 are arranged asymmetrically in relation to plane of symmetry 50 (e.g. FIG. 2). The loading configuration or arrangement of cargo containers 20 in FIG. 1 is also asymmetrical relative to plane of symmetry 50. With the loading configuration illustrated in FIG. 1 and with most of the other loading configurations, not all of locking gaps 25, 27 or longitudinal locking elements 30 are needed. A large proportion of longitudinal locking elements 30 are located underneath cargo containers 20. Therefore longitudinal locking elements 30 can be unfolded from a working position in which they secure a cargo container 20 into a resting position in which they can be driven over by cargo containers 20. So there is no need to remove and then reinstall longitudinal locking elements 30 that are not currently being used.

Longitudinal locking elements 30 each include two locking claws facing in opposing directions along the longitudinal direction (x direction) of aircraft 1. Therefore every locking element 30 secures the longitudinal sides of two cargo containers 20. However, it is also conceivable that particularly in the end regions of aircraft 1, where the width of the fuselage decreases, longitudinal locking elements 30 only include one locking claw each. Locking claws of longitudinal locking elements 30 of a locking gap 25, 27 are arranged in such a way that the locking claws form a limit stop line for one side of a cargo container 20 in each case.

The distances implemented between various locking gaps 25, 27 correspond in particular to standard lengths and/or standard widths of cargo containers 20. The distances implemented include not only the distances between immediately adjacent locking gaps 25, 27 in the longitudinal direction (x direction) of aircraft 1 but also, for example, the distances between one locking gap 25, 27 and the next-but-one adjacent locking gap 25, 27 in the longitudinal direction (x direction) of aircraft 1. The distances may be measured between the locking claws of relevant locking gaps 25, 27 which form the limit stop lines or limit stop planes of cargo containers 20.

The potential combinations of the distances between locking gaps 25, 27 in relation to each other in the longitudinal direction (x direction) of aircraft 1 include in particular distances of 62 inch (157.48 cm), 88 inch (223.52 cm), 96 inch (234.84 cm), 125 inch (317.50 cm), 238.5 inch (605.79 cm) and/or 319 inch (810.26 cm). Other smaller or larger distances between locking gaps 25, 27 are conceivable.

It is possible to leave space free between cargo containers 20 or the pallets in the longitudinal direction (x direction) of aircraft 1 in order to transport goods which extend beyond the cargo container or the pallet. Thus, for example, pallets which contain cargo units up to a length of 360 inch (914.40 cm) may be attached to cargo hold floor 10.

Cargo containers 20 in FIG. 1 are secured in part by symmetrical locking gaps 25 and in part by asymmetrical locking gaps 27.

The distance between plane of symmetry 50 and immediately adjacent longitudinal locking elements 30 to plane of symmetry 50 is essentially the same size in both halves 5, 7. However, it is also conceivable that this distance differs in size in both halves 5, 7.

A larger number of longitudinal locking elements 30 are arranged in second half 7 than in first half 5. It is also conceivable that more longitudinal locking elements 30 are arranged in first half 5 than in second half 7.

Longitudinal locking elements 30 are arranged in both halves 5, 7 in three rows 29 each which run parallel in each case to plane of symmetry 50. A larger or smaller number of rows 29 which are linked to a larger or smaller number of longitudinal locking elements 30 per locking gap 25, 27 is conceivable.

Arranged in some cases between longitudinal locking elements 30 of locking gaps 25, 27 are load attachment devices 35 which are aligned along rows 29 of longitudinal locking elements 30. Load attachment devices 35 may in particular be rollers, ball casters or follower rollers. This makes movement of cargo containers 20 easier on cargo hold floor 10. Cargo containers 20 are moved through cargo hold door 15 into the cargo hold onto cargo hold floor 10. Subsequently, they are driven onto their locking position and secured with longitudinal locking elements 30. Even further elements, e.g. PDUs, may be arranged in cargo hold floor 10 in the region of cargo hold door 15.

FIG. 2 shows a top view onto a further cargo hold floor 10 of an aircraft according to the invention. The arrangement of locking gaps 25, 27 and longitudinal locking elements 30 of the embodiment illustrated in FIG. 2 is different to the embodiment illustrated in FIG. 1. Each symmetrical locking gap 25 in the embodiment illustrated in FIG. 2 includes eight longitudinal locking elements 30 and each asymmetrical locking gap 27 includes four longitudinal locking elements 30. Longitudinal locking elements 30 are accordingly arranged in four rows 29 each per half 5, 7 substantially parallel to plane of symmetry 50.

Load attachment devices 35 are arranged at least in part between locking gaps 25, 27 in the longitudinal direction (x direction) of aircraft 1. Load attachment devices 35 are arranged along rows 29 of longitudinal locking elements 30.

Cargo containers 20 in FIG. 2 are arranged in an asymmetrical loading configuration relative to plane of symmetry 50. All cargo containers 20 illustrated in FIG. 2 have the same dimensions. It is conceivable, however, that cargo containers 20 having a first size are essentially attached in one half 5, 7 while cargo containers 20 having a second size, which differs from the first size, are essentially attached in other half 5, 7. It is also possible to attach cargo containers 20 of a first size in a portion, for example a front portion, of cargo hold floor 10 while cargo containers 20 of a second size, which differs from the first size, are attached in another portion, for example a rear portion, of cargo hold floor 10. Loading configurations with cargo containers 20 which have three, four or even more different sizes are also conceivable.

In the main region of aircraft 1 where the fuselage is at its maximum width, the loading configuration is as follows: In one half 7, cargo containers 20 are aligned with their longest outer edge in the longitudinal direction (x direction) of aircraft 1. However, they only occupy a portion of one half 7. The remaining portion of this first half 7 and entire second half 5 is occupied by cargo containers 20 which are aligned with their longest outer edge in the transverse direction (y direction) of aircraft 1. In both opposing end regions of cargo hold floor 10, in which the width of the fuselage decreases compared to its maximum width, the loading configuration of cargo containers 20 is symmetrical relative to plane of symmetry 50. In these end regions of cargo hold floor 10, the arrangement of longitudinal locking elements 25 and longitudinal locking elements 30 is symmetrical relative to plane of symmetry 50. However, it is also conceivable that longitudinal locking elements 30 are also arranged asymmetrically in the end regions of aircraft 1.

Here too the distance between plane of symmetry 50 and immediately adjacent longitudinal locking elements 30 to plane of symmetry 50 is essentially the same size in both halves 5, 7. However, it is also conceivable here that this distance differs in size in both halves 5, 7.

The loading configuration in FIG. 2 is an asymmetrical load with 32 containers measuring 88 inch (223.52 cm)×125 inch (317.50 cm)×82 inch (208.28 cm) which in the main region in one half 5 are arranged transversally and in other half 7 are arranged longitudinally. The locking claws of lateral guide elements 47 (not shown in FIG. 2) are each located in central positions. The locking claws of central guide elements 40 are each fixed in their outermost positions in second half 7. The loading configuration in FIG. 2 is two-line in the main region of the deck, i.e. exactly two cargo containers 20 are located next to each other on a level in the transverse direction (y direction) of aircraft 1.

FIG. 3 shows a top view onto a cargo hold floor 10 according to the invention. The construction of cargo hold floor 10 in FIG. 3 is identical to the construction of cargo hold floor 10 in FIG. 2. Cargo containers 20 in FIG. 3 are loaded in a symmetrical loading configuration in relation to plane of symmetry 50. However, the loading configuration is asymmetrical compared to fuselage centre-line 60 since cargo hold floor 10 is asymmetrical in its geometric shape compared to fuselage centre-line 60.

In the embodiment illustrated in FIG. 2 and FIG. 3, cargo hold floor 10 also includes transverse locking elements that are not, however, shown in FIG. 2 and FIG. 3.

The loading configuration in FIG. 3 is a symmetrical loading configuration with 15 containers measuring 96 inch (243.84 cm)×196 inch (243.84 cm)×118 inch (299.72 cm), 2 containers measuring 96 inch (243.84 cm)×196 inch (243.84 cm)×116 inch (294.64 cm) and one AMA container. This loading configuration is one-line in the main area of the deck, i.e. exactly one container is located on each level in the transverse direction (y direction) of aircraft 1.

The locking claws of lateral guide elements 47 are located in FIG. 3 in the positions in which they each have the second smallest distance in the transverse direction (y direction) of aircraft 1 to plane of symmetry 50. The locking claws of central guide elements 40 are in their folded down resting position.

FIG. 4 shows a top view onto cargo hold floor 10 according to the invention in accordance with FIG. 2 and FIG. 3. The two-line loading configuration in FIG. 4 is an asymmetrical load with 4 containers measuring 96 inch (243.84 cm)×238.5 inch×116 inch (294.64 cm), 7 containers measuring 96 inch (243.84 cm)×238.5 inch×118 inch (299.72 cm), 4 AMX containers measuring 96 inch (243.84 cm)×128 inch (325.12 cm)×116 inch (294.64 cm) and one AMA container. The locking claws of lateral guide elements 47 are located in FIG. 4 in the positions in which they each have the second smallest distance in the transverse direction (y direction) of aircraft 1 to plane of symmetry 50. The locking claws of central guide elements 40 are each located in the positions in which they have the smallest distance to plane of symmetry 50.

FIG. 5 shows a top view onto cargo hold floor 10 according to the invention in accordance with FIGS. 2-4. The partly one-line and partly two-line loading configuration is a symmetrical load with 3 containers measuring 96 inch (243.84 cm)×238.5 inch×118 inch (299.72 cm), 4 AML containers measuring 96 inch (243.84 cm)×125 inch×116 inch (294.64 cm), 10 containers measuring 96 inch (243.84 cm)×125 inch (317.50 cm)×118 inch (299.72 cm) and one AMA container. The locking claws of lateral guide elements 47 are located in FIG. 5 in the region in which the loading configuration is two-line in the positions in which they each have the second smallest distance in the transverse direction (y direction) of aircraft 1 to plane of symmetry 50. Lateral guide elements 47 and central guide elements 40 are not needed in the region in which the loading configuration is one-line. The locking claws of central guide elements 40 are located in the region in which the loading configuration is two-line, in the positions in which they each have the smallest distance to plane of symmetry 50.

FIG. 6 shows a top view onto cargo hold floor 10 according to the invention in accordance with FIGS. 2-5. The two-line loading configuration in the main region of the deck is a symmetrical loading configuration with 27 AAJ containers measuring 88 inch (223.52 cm)×125 inch (317.50 cm)×96 inch (243.84 cm). The locking claws of lateral guide elements 47 are located in FIG. 6 in the positions in which they each have the smallest distance in the transverse direction (y direction) of aircraft 1 to plane of symmetry 50. The locking claws of central guide elements 40 are each located in the positions in which they have the smallest distance to plane of symmetry 50.

FIG. 7 shows a top view onto cargo hold floor 10 according to the invention in accordance with FIGS. 2-6. The two-line loading configuration in the main region of the deck is an asymmetrical loading configuration with 7 cargo units measuring 360 inch (914.40 cm)×96 inch (243.84 cm)×118 inch (299.72 cm), 4 AMX containers, one AML container and one AMA container. The locking claws of lateral guide elements 47 are located in FIG. 7 in the positions in which they each have the second smallest distance in the transverse direction (y direction) of aircraft 1 to plane of symmetry 50. The locking claws of central guide elements 40 are each located in the positions in which they have the smallest distance to plane of symmetry 50.

FIG. 8 shows a top view onto cargo hold floor 10 according to the invention in accordance with FIGS. 2-7. The partly one-line and partly two-line loading configuration is a symmetrical loading configuration with 4 special pallets measuring 319 inch (810.26 cm)×96 inch (243.84 cm)×118 inch (299.72 cm) containing cargo units measuring no more than 360 inch (914.40 cm)×96 inch (243.84 cm)×118 inch (299.72 cm) and a combination of AMX, AML and AMA containers which in the main region are arranged in each case to the right and left next to the special pallets. Lateral guide elements 47 and central guide elements 40 are not needed in this loading configuration. The locking claws of central guide elements 40 are in the folded down resting position.

FIG. 9 shows a top view onto cargo hold floor 10 according to the invention in accordance with FIGS. 2-8. The three-line loading configuration in the main region of the deck, i.e. three cargo containers are located next to each other, is a symmetrical loading configuration with 32 AYY containers measuring 62 inch (157.48 cm)×88 inch (223.52 cm)×82 inch (208.28 cm) and 15 AMJ containers measuring 96 inch (243.84 cm)×125 inch (317.50 cm)×96 inch (243.84 cm). The locking claws of lateral guide elements 47 are located in FIG. 9 in the region in which the loading configuration is three-line in the positions in which they each have the greatest distance in the transverse direction (y direction) of aircraft 1 to plane of symmetry 50. In the region where the loading configurations are two-line, there are locking claws of lateral guide elements 47 in the positions in which they each have the smallest distance in the transverse direction (y direction) of aircraft 1 to plane of symmetry 50.

Central guide elements 40 are not needed in the region in which the loading configuration is three-line. Therefore their locking claws are in the lowered resting position. The locking claws of central guide elements 40 are located in the region in which the loading configuration is two-line, in the positions in which they each have the smallest distance to plane of symmetry 50.

Figure 10:
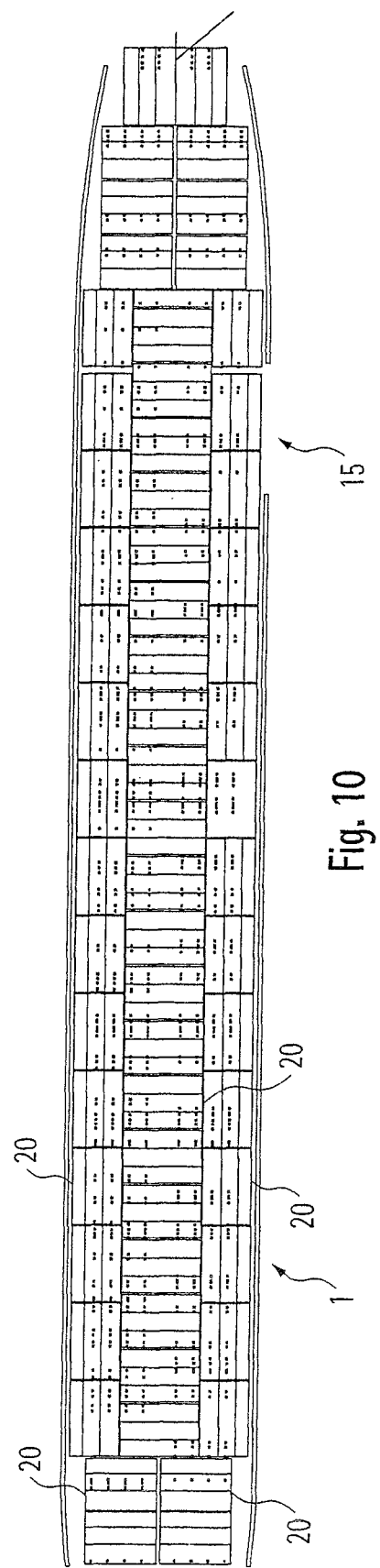

FIG. 10 shows a top view onto cargo hold floor 10 according to the invention in accordance with FIGS. 2-9. The three-line loading configuration in the main region of the deck is a symmetrical loading configuration with 63 containers measuring 62 inch (157.48 cm)×88 inch (223.52 cm)×92 inch (233.68 cm). In the region where the loading configurations are three-line, there are locking claws of lateral guide elements 47 in the positions in which they each have the second smallest distance in the transverse direction (y direction) of aircraft 1 to plane of symmetry 50. In the region where the loading configuration is two-line, there are locking claws of lateral guide elements 47 in the positions in which they each have the smallest distance in the transverse direction (y direction) of aircraft 1 to plane of symmetry 50.

The locking claws of central guide elements 40 are located in the region in which the loading configuration is three-line, in their lowered resting position The locking claws of central guide elements 40 are located in the region in which the loading configuration is two-line, in the positions in which they each have the smallest distance to plane of symmetry 50.

Figure 11:
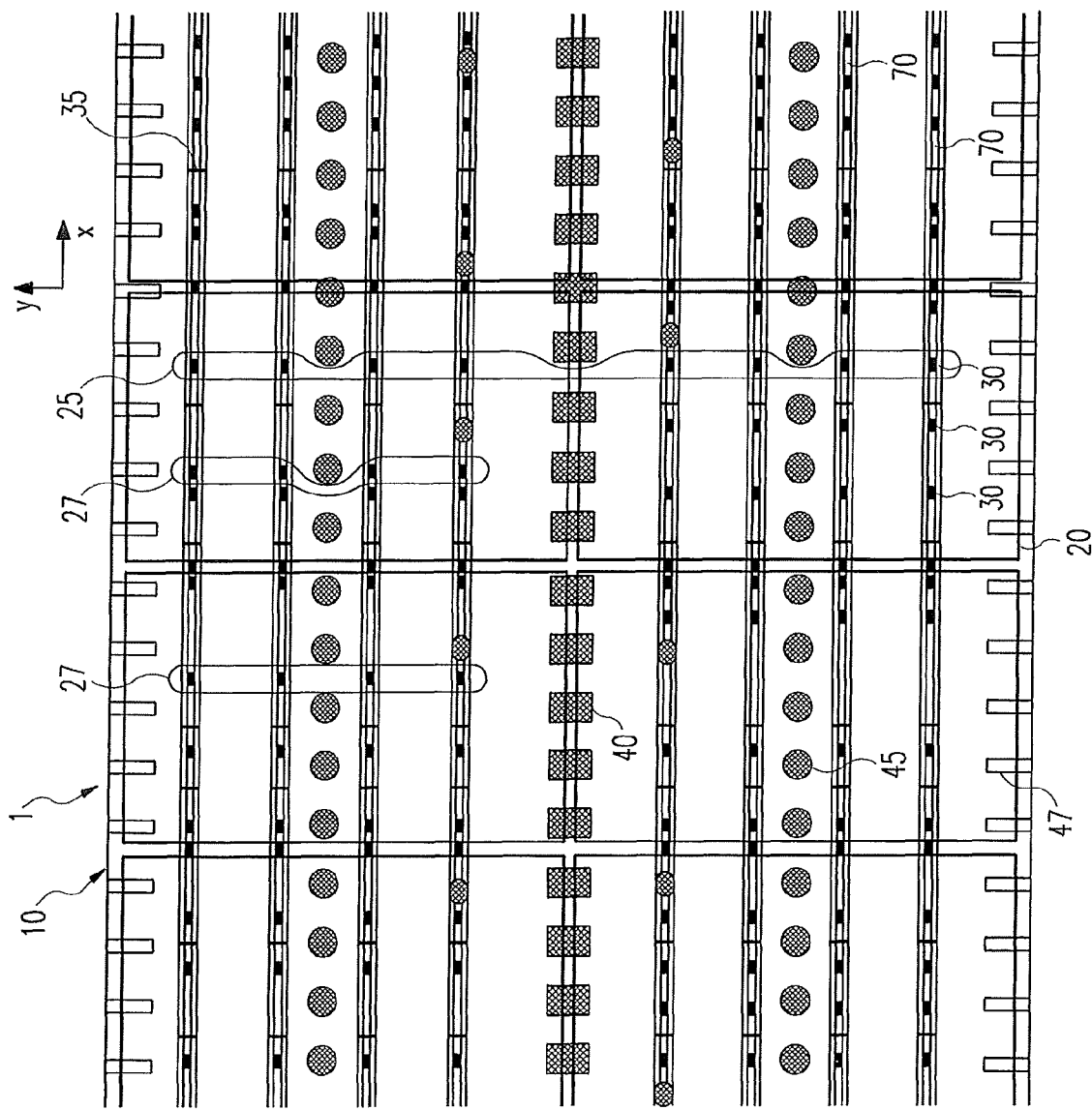
FIG. 11 a top view onto part of a further cargo hold floor.

FIG. 11 shows a top view onto a detail of a further cargo hold floor 10 according to the invention. The arrangement of locking gaps 25, 27 and longitudinal locking elements 30 in the embodiment illustrated in FIG. 11 is different compared to the embodiments illustrated in FIG. 1-10. Cargo hold floor 10 of the embodiment illustrated in FIG. 11 includes a plurality of symmetrical and asymmetrical locking gaps 25, 27.

Longitudinal locking elements 30 in each of halves 5, 7 are each arranged in anchor rails 70 which run essentially parallel to the longitudinal axis of aircraft 1. Four anchor rails 70 running parallel to each other are arranged in each half 5, 7. The distance of immediately adjacent anchor rails 70 to plane of symmetry 50 is the same size in both halves 5, 7 respectively. It is also conceivable that the distances in both halves 5, 7 differ in size.

The distances of anchor rails 70 to each other are the same size in both halves 5, 7. However, it is also conceivable that the distances to each other in each of halves 5, 7 or only in one half 5, 7 differ in size.

Longitudinal locking elements 30, which are arranged in anchor rails 70, are arranged asymmetrically relative to plane of symmetry 50. Transverse locking elements 40, 45, 47 can also be seen in FIG. 11 in addition to longitudinal locking elements 30. Close to plane of symmetry 50, i.e. at a distance in the transverse direction (y direction) of aircraft 1 of less than 30 cm, are located transverse locking elements 40 as central guide elements for securing cargo containers 20 in the transverse direction (y direction) of aircraft 1. Central guide elements 40 encompass what are known as centre latches each of which includes two locking claws. The locking claws of the centre latches are moveable independently of each other along the transverse direction (y direction) of aircraft 1 and fixable at various positions of the transverse direction. Centre latches 40 are located essentially at the same level relative to the transverse direction (y direction) of the aircraft. Centre latches 40 are all arranged in a row essentially parallel to plane of symmetry 50 on cargo hold floor 10. However, it is also conceivable that single or multiple centre latches 40 are located at different levels relative to the transverse direction (y direction) of aircraft 1. Centre latches 40 may in particular be such centre latches as are described in the international patent application that was filed under file reference PCT/EP2009/004484 at the European Patent Office on 22 Jun. 2009.

In addition to these transverse locking elements 40 as central guide elements, further transverse locking elements 47 are arranged as lateral guide elements on both opposing lateral outer edges of cargo hold floor 10. Lateral guide elements 47 each include a locking claw which is moveable along the transverse direction (y direction) of aircraft 1 and fixable in various positions along the transverse direction (y direction) of aircraft 1. This means that cargo hold floor 10 can be adapted to cargo containers 20 with different extensions in the aircraft's transverse direction (y direction). This increases the number of potential loading configurations.

Lateral guide elements 47 may each have at least one lateral guide device having a sliding carriage whereby the lateral guide device is movably supported in the mounting frame in the transverse direction (y direction) of aircraft 1. The mounting frame, which is substantially U-shaped and has lateral rails that are integrally joined to a mounting base, thus makes it possible for the lateral guide devices to be moved within it in the transverse direction (y direction) of aircraft 1. The movability of the lateral guide devices is ensured by means of a first sliding carriage or by means of a second sliding carriage whereby these sliding carriages are slidingly supported in guides of the lateral rails provided for this purpose. To fix the lateral guide device in the various positions, axle stubs provided for this purpose which form part of a fixing device engage alternately in the holes provided at the corresponding positions. With one lateral guide element 47, in which two lateral guide devices are arranged in the mounting frame, it is possible to remove both one and also the other lateral guide device from the mounting frame by slipping them out at the open ends of said mounting frame. In this respect, this gives rise to numerous potential loading configurations.

Between lateral guide elements 47 and central guide elements 40, further transverse locking elements 45 for securing cargo containers 20 in the transverse direction (y direction) of aircraft 1 are arranged at approximately the same distance to central guide elements 40 and lateral guide elements 47 in the transverse direction (y direction) of aircraft 1. These further transverse locking elements 45 each encompass two locking claws which point in opposing directions along the transverse direction (y direction) of aircraft 1. These further transverse locking elements 45 may also be movable along the transverse direction (y direction) of aircraft 1 and fixable in various positions along the transverse direction (y direction) of aircraft 1. It is also conceivable that in the transverse direction (y direction) of aircraft 1 even further additional transverse locking elements are arranged between central guide elements 40 and further transverse locking elements 45.

Transverse locking elements 40, 45, 47 can be unfolded at least partially from a working position in which they secure one or a plurality of cargo containers 20 into a resting position in which they can be driven over by cargo containers 20. Therefore transverse locking elements 40, 45, 47 need not be removed when they are not required. One-line, two-line or three-line loading configurations are enabled in this way. Four-line loading configurations or loading configurations with more than four lines are also conceivable.

Longitudinal locking elements 30 are arranged in such positions in the longitudinal direction (x direction) of aircraft 1 in which no transverse locking elements 40, 45, 47 for securing cargo containers 20 in the transverse direction (y direction) of aircraft 1 are located on the same level in the longitudinal direction (x direction) of aircraft 1.

Due to the at least partial movability of transverse locking elements 40, 47, cargo hold floor 10 can be adapted not just to different extensions of cargo containers 20 in the longitudinal direction (x direction) of aircraft 1 but also to cargo containers 20 with varying extensions in the transverse direction (y direction) of aircraft 1. This increases the adaptability of cargo hold floor 10 to various types of cargo containers 20 and the number of potential loading configurations.

In some cases load attachment devices 35 are arranged in anchor rails 70 between longitudinal locking elements 30.

The possible distances in the transverse direction (y direction) of aircraft 1 between the various fixing positions of lateral guide elements 47 and plane of symmetry 50 are approximately 90.3 inch (229.362 cm), 98.3 inch (249.682 cm) and 108.0 inch (274.32 cm). The distance between the outer fixing positions of further transverse locking elements

45 in the transverse direction (y direction) of the aircraft is approximately 96.4 inch (244.856 cm). The minimum distance between the locking claws of further transverse locking elements 45 and the plane of symmetry is approximately 44 inch (111.76 cm).

For example, with cargo hold floor 10 according to the invention, the following loading configurations or some thereof are possible:

- symmetrical load with 27 containers (AMX, AML and AMA containers mixed);
- asymmetrical load with 30 containers measuring 96 inch (243.84 cm)×125 inch (317.50 cm)×116 inch (294.64 cm), which in the main region are arranged transversally in one half and longitudinally in the other half;
- symmetrical load with 26 containers measuring 96 inch (243.84 cm)×125 inch (317.50 cm)×116 inch (294.64 cm) and one AMA container;
- asymmetrical load with 29 containers measuring 96 inch (243.84 cm)×125 inch (317.50 cm)×116 inch (294.64 cm) and one AMA container;
- asymmetrical load with 32 containers measuring 88 inch (223.52 cm)×125 inch (317.50 cm)×116 inch (294.64 cm);
- asymmetrical load with 14 containers measuring 96 inch (243.84 cm)×125 inch (317.50 cm)×116 inch (294.64 cm) and 16 containers measuring 88 inch (223.52 cm)×125 inch (317.50 cm)×116 inch (294.64 cm);
- asymmetrical load with 4 containers measuring 96 inch (243.84 cm)×238.5 inch×116 inch (294.64 cm), 7 containers measuring 96 inch (243.84 cm)×238.5 inch×118 inch (299.72 cm), 4 AMX containers measuring 96 inch (243.84 cm)×128 inch (325.12 cm)×116 inch (294.64 cm) and one AMA container;
- symmetrical load with 3 containers measuring 96 inch (243.84 cm)×238.5 inch×118 inch (299.72 cm), 4 AML containers measuring 96 inch (243.84 cm)×125 inch (317.50 cm)×116 inch (294.64 cm), 10 containers measuring 96 inch (243.84 cm)×125 inch (317.50 cm)×118 inch (299.72 cm) and one AMA container;
- symmetrical load with 15 containers measuring 96 inch (243.84 cm)×196 inch (243.84 cm)×118 inch (299.72 cm) and 2 containers measuring 96 inch (243.84 cm)×196 inch (243.84 cm)×116 inch (294.64 cm) and one AMA container;
- asymmetrical load with 32 containers measuring 88 inch (223.52 cm)×125 inch (317.50 cm)×82 inch (208.28 cm), which in the main region are arranged transversally in one half and longitudinally in the other half;
- symmetrical load with 27 AAJ containers measuring 88 inch (223.52 cm)×125 inch (317.50 cm)×96 inch (243.84 cm);
- symmetrical load with 7 cargo units measuring 360 inch (914.40 cm)×96 inch (243.84 cm)×118 inch (299.72 cm), 4 AMX containers, one AML container and one AMA container;
- symmetrical load with 4 special pallets measuring 319 inch (810.26 cm)×96 inch (243.84 cm)×118 inch (299.72 cm) containing cargo units measuring no more than 360 inch (914.40 cm)×96 inch (243.84 cm)×118 inch (299.72 cm) and a combination of AMX, AML and AMA containers which in the main region are arranged in each case to the right and left next to the special pallets;
- symmetrical load with 32 AYY containers measuring 62 inch (157.48 cm)×88 inch (223.52 cm)×82 inch (208.28 cm) and 15 AMJ containers measuring 96 inch (243.84 cm)×125 inch (317.50 cm)×96 inch (243.84 cm); and/or
- symmetrical load with 63 containers measuring 62 inch (157.48 cm)×88 inch (223.52 cm)×92 inch (233.68 cm).

Other loading configurations with containers 20 having other dimensions are conceivable.

Locking gaps 25, 27 which have longitudinal locking elements 30 in both halves 5, 7 may each comprise at least four, in particular eight, longitudinal locking elements 30. An even better distribution of the forces arising is achieved as a result of this.

In one half 5, 7, a larger number of locking elements 30 may be arranged than in other half 5, 7. The advantage of this is that in one half 5, 7 the number of loading configurations for cargo containers 20 is further increased without increasing the weight of cargo hold floor 10 unnecessarily in that the same number of further locking elements 30 is arranged in other half 5, 7.

Load attachment devices 35, in particular rollers, ball casters or follower rollers may be arranged at least in part between locking gaps 25, 27 along the longitudinal direction (x direction) of aircraft 1. The advantage of this is that the movement of cargo containers 20 is made significantly easier when loading and unloading aircraft 1. In addition, this makes it easier to position cargo containers 20 precisely in their locking positions.

Further transverse locking elements 45 for securing cargo containers 20 in the transverse direction (y direction) of aircraft 1 may be arranged between central guide elements 40 and lateral guide elements 47. This increases the number of potential loading configurations for cargo containers 20 even further.

At this point it should be pointed out that all the parts described above, seen on their own and in any combination, in particular the details illustrated in the drawings, are claimed as being essential for the invention. Modifications of this are familiar to the person skilled in the art.

REFERENCE NUMBERS

1 Aircraft
5 First half
7 Second half
10 Cargo hold floor
15 Cargo hold door
20 Cargo container
25 Symmetrical locking gap (with locking elements in both halves)
27 Asymmetrical locking gap (with all locking elements in one half only)
29 Row of locking elements
30 Longitudinal locking elements
35 Load attachment devices
40 Central guide elements
45 Further transverse locking elements for securing in y direction
47 Lateral guide elements
50 Plane of symmetry of the deck or cargo hold floor
60 Fuselage centre-line
70 Anchor rails

What is claimed is:
1. A cargo hold floor of an upper and/or lower deck of an aircraft having a plane of symmetry which divides the cargo hold floor into a first half and a second half, comprising:
locking gaps which each encompass all the locking elements located substantially on one level in a longitudinal direction (x direction) of the aircraft, in particular longitudinal locking elements, for securing standardised cargo containers, in particular pallets or containers, in the longitudinal direction (x direction) of the aircraft,
wherein all longitudinal locking elements of at least one first locking gap are arranged in only one of the halves.

2. A cargo hold floor according to claim 1, wherein locking claws of the longitudinal locking elements of the first locking gap or of a second locking gap of the locking gaps are arranged in such a way that the locking claws form a limit stop line for one side of a cargo container.

3. A cargo hold floor according to claim 1, wherein the at least first locking gap or at least one third locking gap includes at least two longitudinal locking elements in one half.

4. A cargo hold floor according to claim 1, wherein the cargo hold floor includes symmetrical locking gaps which have longitudinal locking elements in both halves as well as asymmetrical locking gaps which have longitudinal locking elements in only one half.

5. A cargo hold floor according to claim 1, wherein distances between the first locking gap and two immediately adjacent locking gaps to the first locking gap or at least one fourth locking gap of the locking gaps and two immediately adjacent locking gaps to the fourth locking gap differ in size.

6. A cargo hold floor according to claim 1, wherein the locking elements are arranged in such positions in the longitudinal direction (x direction) of the aircraft in which no corresponding transverse locking elements for securing cargo containers in a transverse direction (y direction) of the aircraft are located on the same level in the longitudinal direction (x direction) of the aircraft.

7. A cargo hold floor according to claim 1, wherein the locking gaps are arranged for receiving standardised cargo containers which in particular have standard lengths or standard widths of approximately 62 inch (157.48 cm), approximately 88 inch (223.52 cm), approximately 96 inch (243.84 cm), approximately 125 inch (317.50 cm), approximately 238.5 inch (605.79 cm) or approximately 319 inch (810.26 cm).

8. A cargo hold floor according to claim 1, wherein a distance of at least one pair of asymmetrical locking gaps in the longitudinal (x direction) of the aircraft corresponds to a standard length or standard width of cargo containers.

9. A cargo hold floor according to claim 1, wherein the cargo hold floor includes anchor rails in the longitudinal direction (x direction) of the aircraft for receiving the longitudinal locking elements whereby the anchor rails are preferably part of roller conveyors.

10. A cargo hold floor according to claim 9, wherein in sections at least the distances of the anchor rails to each other are the same size in each of the halves.

11. A cargo hold floor according to claim 1, wherein the first locking gap or at least one fifth locking gap of the locking gaps has longitudinal locking elements with two locking claws essentially facing in opposing directions along the longitudinal direction (x direction) of the aircraft.

12. A cargo hold floor according to claim 1, wherein transverse locking elements are arranged on an outer edge of the cargo hold floor as lateral guide elements which are fixable in various positions along a transverse direction (y direction) of the aircraft.

13. A cargo hold floor according to claim 1, wherein corresponding lateral guide elements are arrangeable in such a manner that a distance between the lateral guide elements is at least 5 m.

14. A cargo hold floor according to claim 1, wherein transverse locking elements are arranged close to the plane of symmetry as central guide elements which are fixable in various positions along a transverse direction (y direction) of the aircraft.

15. A cargo hold floor according to claim 1, wherein locking claws of transverse locking elements are at least partially movable independently of each other or at least partially foldable into a lowered position.

16. An aircraft having a cargo hold floor according to claim 1.

* * * * *